US012541591B2

United States Patent
Du et al.

(10) Patent No.: US 12,541,591 B2
(45) Date of Patent: Feb. 3, 2026

(54) MALWARE DETECTION FOR DOCUMENTS USING KNOWLEDGE DISTILLATION ASSISTED LEARNING

(71) Applicant: Palo Alto Networks, Inc., Santa Clara, CA (US)

(72) Inventors: Min Du, Santa Clara, CA (US); Curtis Leland Carmony, Albuquerque, NM (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 20 days.

(21) Appl. No.: 17/853,768

(22) Filed: Jun. 29, 2022

(65) Prior Publication Data

US 2023/0342461 A1 Oct. 26, 2023

Related U.S. Application Data

(60) Provisional application No. 63/350,296, filed on Jun. 8, 2022, provisional application No. 63/334,574, filed on Apr. 25, 2022.

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,256,068 B1* | 7/2001 | Takada | G06T 3/4007 348/556 |
| 8,521,667 B2 | 8/2013 | Zhu | |
| 9,178,901 B2 | 11/2015 | Xue | |
| 9,253,208 B1 | 2/2016 | Koshelev | |
| 9,398,047 B2 | 7/2016 | Goutal | |
| 9,690,938 B1* | 6/2017 | Saxe | G06N 20/00 |
| 9,973,531 B1 | 5/2018 | Thioux | |
| 10,169,579 B1 | 1/2019 | Xu | |
| 10,805,346 B2 | 10/2020 | Kumar | |
| 10,904,286 B1 | 1/2021 | Liu | |
| 10,984,512 B2* | 4/2021 | Jang | G06T 5/50 |
| 11,188,977 B2 | 11/2021 | Youb | |

(Continued)

OTHER PUBLICATIONS

Abdelnabi et al., VisualPhishNet: Zero-Day Phishing Website Detection by Visual Similarity, CCS '20, Nov. 2020, pp. 1681-1698.

(Continued)

*Primary Examiner* — Jeffrey C Pwu
*Assistant Examiner* — Mayasa A. Shaawat
(74) *Attorney, Agent, or Firm* — Van Pelt, Yi & James LLP

(57) ABSTRACT

The detection of malicious documents using knowledge distillation assisted learning is disclosed. A document is received for maliciousness determination. A likelihood that the received document represents a threat is determined. The determination is made, at least in part, using a raw bytes model that was trained, at least in part, using image model prediction probabilities. A verdict for the document is provided as output based at least in part on the determined likelihood.

23 Claims, 14 Drawing Sheets

(56) References Cited

U.S. PATENT DOCUMENTS

| | | |
|---|---|---|
| 11,444,978 B1 | 9/2022 | Liao |
| 11,501,120 B1 | 11/2022 | Petersen |
| 2002/0143892 A1* | 10/2002 | Mogul ............... H04L 67/5682 709/217 |
| 2011/0007366 A1 | 1/2011 | Sarkar |
| 2011/0247072 A1 | 10/2011 | Staniford |
| 2015/0067857 A1 | 3/2015 | Symons |
| 2015/0205964 A1 | 7/2015 | Eytan |
| 2015/0244730 A1 | 8/2015 | Vu |
| 2016/0092684 A1 | 3/2016 | Langton |
| 2016/0188541 A1* | 6/2016 | Chulinin ............... G06F 40/295 704/8 |
| 2017/0032279 A1 | 2/2017 | Miserendino |
| 2017/0187535 A1 | 6/2017 | Middleton |
| 2018/0159871 A1 | 6/2018 | Komashinskiy |
| 2018/0183611 A1 | 6/2018 | Bohli |
| 2019/0104154 A1 | 4/2019 | Kumar |
| 2019/0205620 A1 | 7/2019 | Yi |
| 2019/0221313 A1 | 7/2019 | Rim |
| 2019/0236273 A1 | 8/2019 | Saxe |
| 2019/0272375 A1* | 9/2019 | Chen ...................... G06N 5/045 |
| 2019/0332769 A1 | 10/2019 | Fralick |
| 2019/0384913 A1 | 12/2019 | Usui |
| 2020/0042708 A1 | 2/2020 | Usui |
| 2020/0136815 A1 | 4/2020 | Trevethan |
| 2020/0137082 A1 | 4/2020 | Jimenez-Delgado |
| 2020/0219097 A1 | 7/2020 | Chan |
| 2020/0314122 A1 | 10/2020 | Jones |
| 2020/0358819 A1 | 11/2020 | Bowditch |
| 2021/0120013 A1 | 4/2021 | Hines |
| 2021/0126944 A1 | 4/2021 | Lesperance |
| 2021/0234892 A1 | 7/2021 | Narayanaswamy |
| 2021/0297428 A1 | 9/2021 | Hatekar |
| 2021/0311934 A1 | 10/2021 | Fang |
| 2021/0326436 A1 | 10/2021 | West |
| 2021/0326869 A1 | 10/2021 | Fang |
| 2021/0398116 A1 | 12/2021 | Fang |
| 2022/0004713 A1 | 1/2022 | Han |
| 2022/0035878 A1 | 2/2022 | Sarah |
| 2022/0036123 A1 | 2/2022 | Cummings |
| 2022/0156725 A1 | 5/2022 | Iwama |
| 2022/0327376 A1 | 10/2022 | Xu |
| 2022/0377107 A1 | 11/2022 | Lee |
| 2022/0405752 A1 | 12/2022 | Davies |
| 2023/0004967 A1 | 1/2023 | Davies |
| 2023/0132720 A1 | 5/2023 | Khmaissia |
| 2023/0179627 A1 | 6/2023 | Takashi |
| 2023/0222762 A1 | 7/2023 | Andriushchenko |
| 2023/0245485 A1 | 8/2023 | Rimchala |
| 2023/0252148 A1* | 8/2023 | Hatekar ................ G06F 21/53 726/23 |
| 2023/0281310 A1* | 9/2023 | Chen ..................... G06N 3/0475 726/24 |
| 2023/0342460 A1 | 10/2023 | Du |
| 2023/0342461 A1 | 10/2023 | Du |
| 2023/0344867 A1 | 10/2023 | Du |
| 2023/0394144 A1 | 12/2023 | Boll |
| 2024/0039948 A1 | 2/2024 | Koc |

OTHER PUBLICATIONS

Finlayson et al., Detecting Phishing with Computer Vision: Part 2, SpeedGrapher, Elastic.co, Aug. 23, 2018, https://www.elastic.co/blog/detecting-phishing-computer-vision-part-2-speedgrapher.

Hinton et al., Distilling the Knowledge in a Neural Network, Mar. 9, 2015.

Zhang et al., Deep Mutual Learning, In Proceedings of the IEEE Conference on Computer Vision and Pattern Recognition, 2018, pp. 4320-4328.

\* cited by examiner

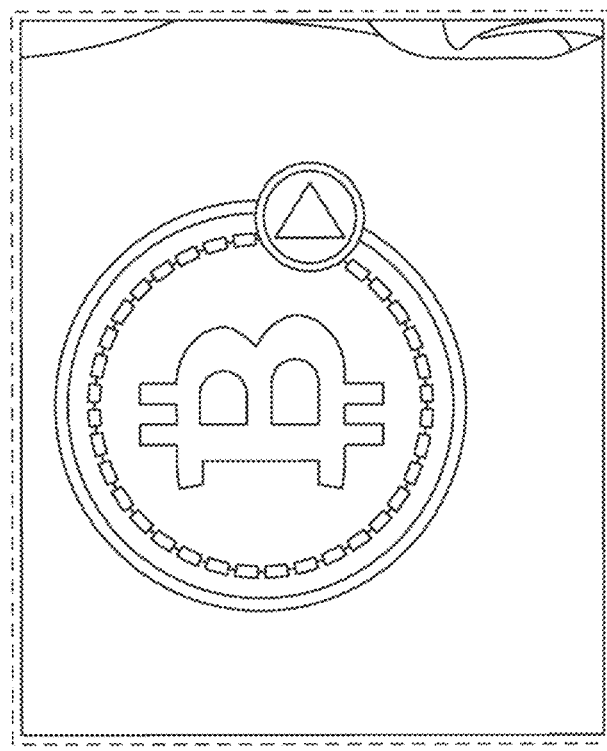
FIG. 6B
FIG. 6A

MALWARE DETECTION FOR DOCUMENTS USING KNOWLEDGE DISTILLATION ASSISTED LEARNING

CROSS REFERENCE TO OTHER APPLICATIONS

This application claims priority to U.S. Provisional Patent Application No. 63/334,574 entitled DETECTING PHISHING PDFS WITH AN IMAGE-BASED DEEP LEARNING APPROACH filed Apr. 25, 2022, and claims priority to U.S. Provisional Patent Application No. 63/350,296 entitled MALWARE DETECTION FOR DOCUMENTS USING KNOWLEDGE DISTILLATION ASSISTED LEARNING filed Jun. 8, 2022, each of which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information through phishing or other techniques), and/or gaining access to private/proprietary computer systems and/or computer networks. Malware can be in the form of code, scripts, documents, active content, and/or other software. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 6A and 6B illustrate examples of portions of phishing PDF files.

DETAILED DESCRIPTION

Figure 1:
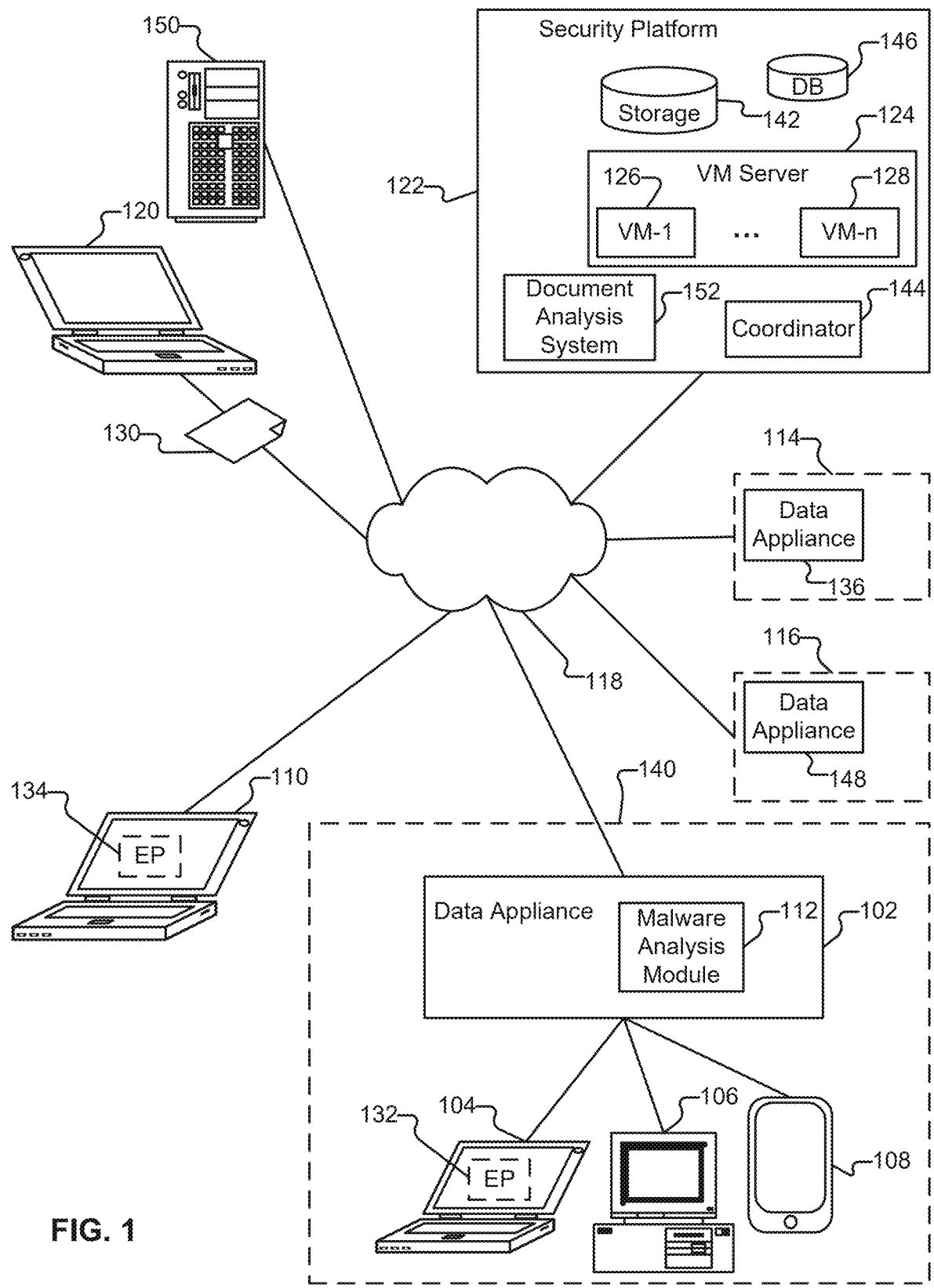
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. OVERVIEW

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. EXAMPLE ENVIRONMENT

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Office documents, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
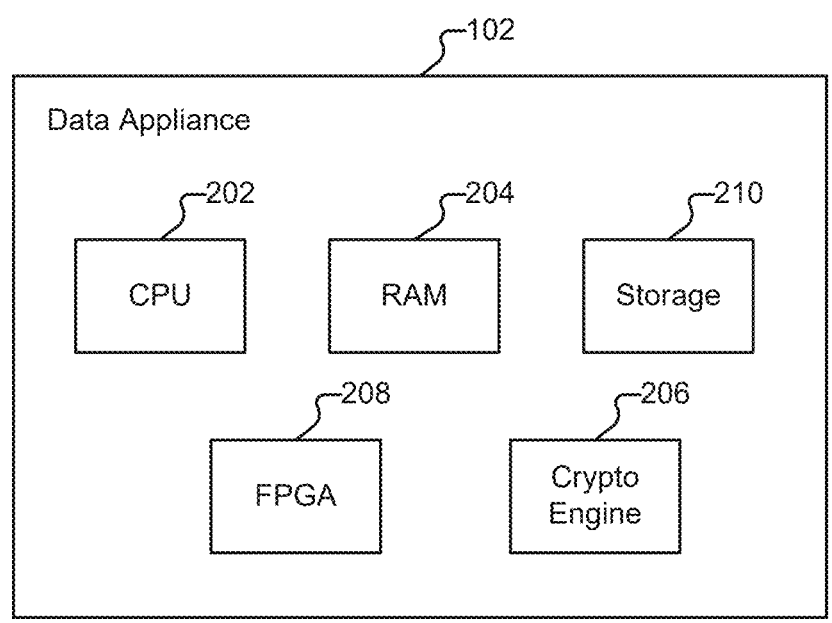
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SHH; and so on.

Figure 2B:
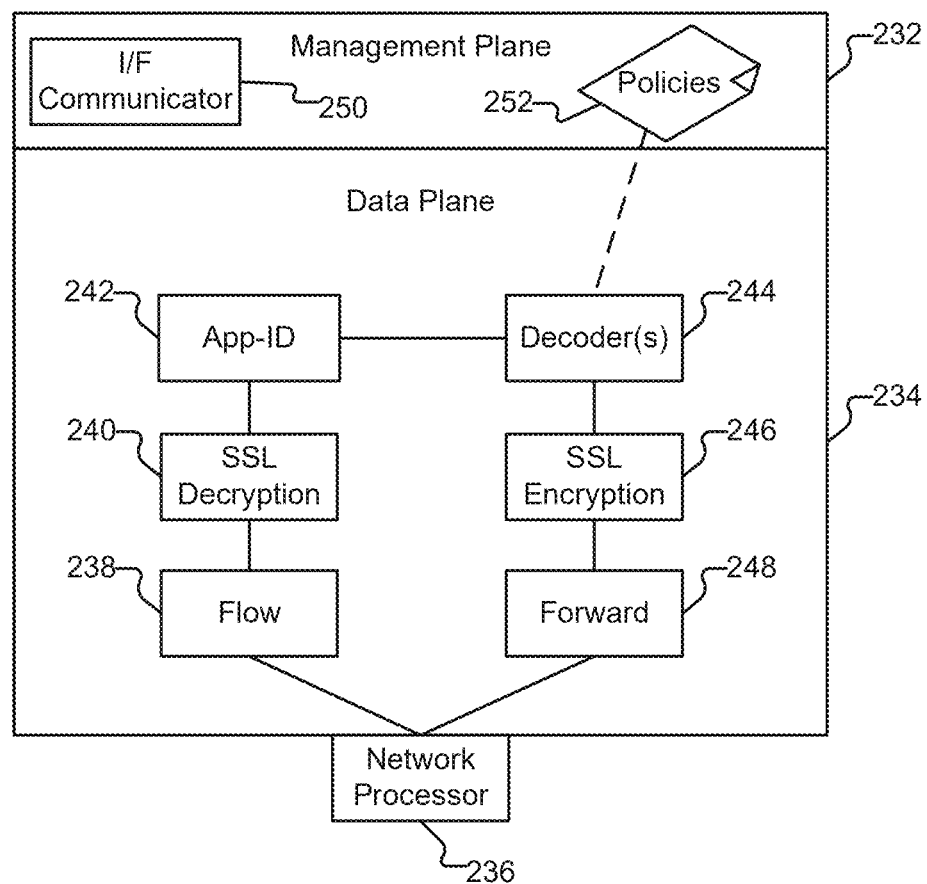
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244.

Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. SECURITY PLATFORM

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104 as an employee of ACME Corporation (who maintains enterprise network 140). A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security, platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. ANALYZING SAMPLES USING STATIC/DYNAMIC ANALYSIS

Figure 3:
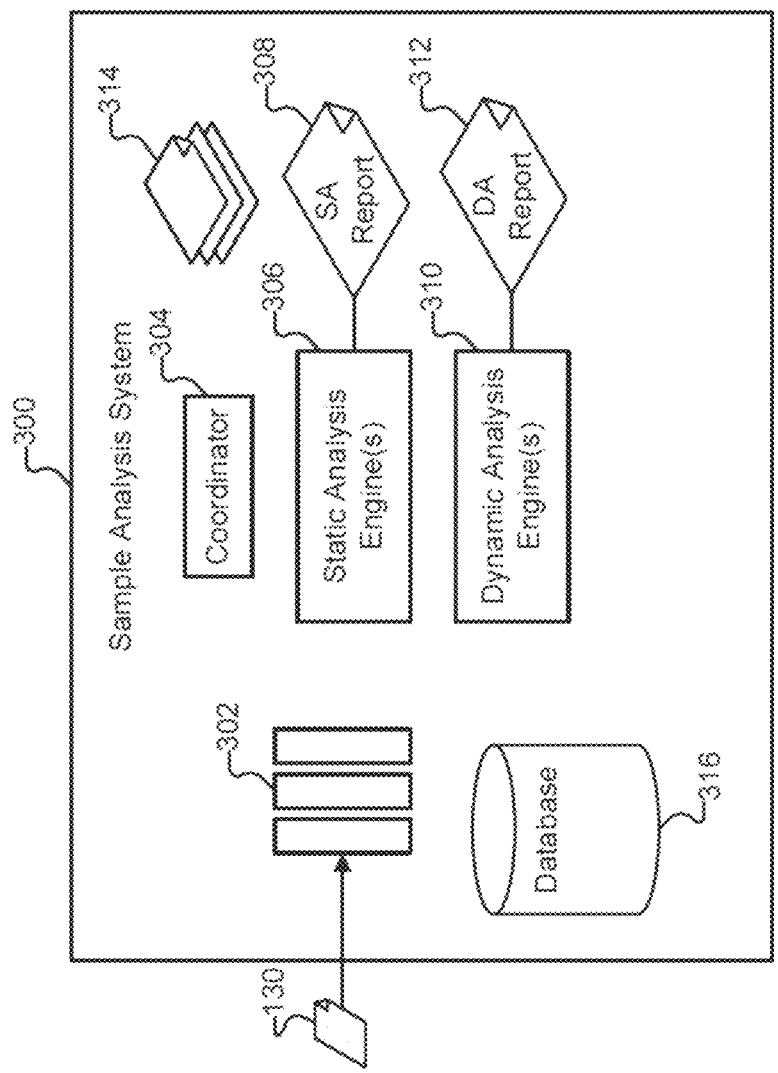
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. DETECTING PHISHING PDFS WITH AN IMAGE-BASED DEEP LEARNING APPROACH

A. Introduction

Portable Document Format (PDF) is a commonly used file format broadly used across many industries. Unfortunately, PDF documents have extensively been exploited by malicious individuals and/or organizations to launch a variety of attacks. One example of such an attack is a phishing attack. PDF files pose a particularly attractive phishing vector as they are cross- platform. An example of such an attack using a PDF is as follows. Returning to the environment of FIG. 1, an attacker (e.g., using system 120) can create a PDF document (e.g., as malware 130) that includes a visually deceptive image (such as a checkbox) that an unsuspecting recipient (e.g., Alice, operating client device 104) will tend to click. Clicking on the seemingly innocuous image will result in redirection to a malicious web resource. In some cases, the malicious website may be directly linked in the PDF document (e.g., a URL to www.malicious-site.com may be explicitly included in the document). However, by using such direct linking, the malicious nature of document 130 may be readily ascertained by a system such as data appliance 102 (e.g., by evaluating any links inside the PDF document against a list of known malicious websites provided to data appliance 102 by security platform 122). More typically, an attacker will make use of traffic redirection to route a phishing victim to a phishing site. In a typical traffic redirection scenario, links embedded in the malicious PDF document take the victim to a gating website from which the victim is then redirected to a malicious website, or several sites in a sequential manner. In addition to evading URL-blocklist based detection, the redirection approach also lets the attacker change the final objective of the lure as needed/over time. For example, the attacker could change the final (malicious) website from a credential stealing site to a credit card fraud site. The following are examples of five different kinds of phishing attacks that can be perpetrated using phishing PDFs. All of these types of attacks can be mitigated by embodiments of security platform 122 (e.g., in conjunction with document analysis system 152), while also minimizing false positives (so as to not disrupt the exchange of legitimate PDFs) as will be described in more detail below.

1. Fake CAPTCHA

Figure 4:
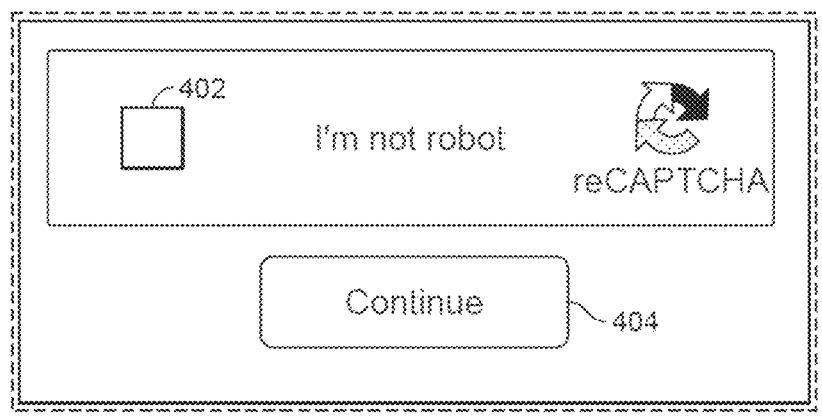
FIG. 4 illustrates an example of a portion of a phishing PDF file.

Fake CAPTCHA PDF files demand that a user verify themselves through a fake challenge-response test that purports to help determine whether the user is human or not. Instead of using a real CAPTCHA, the attacker embeds an image of a CAPTCHA test. An example of such an image is shown in FIG. 4. The PDF document may include, as an element, a radio button in region 402 that the user can interact with (and further lead the user to believe that the CAPTCHA is legitimate). When the user attempts to "verify" by clicking on continue button 404, they will be taken to an attacker-controlled website.

2. Coupon

Figure 5:
FIG. 5 illustrates an example of a portion of a phishing PDF file.

Coupon-themed phishing PDF files typically offer, to a user, a discount that purports to be collectable in exchange for clicking on an image. An example of such a phishing PDF file is depicted in FIG. 5. In the example shown in FIG. 5, a prominent oil company's logo is included in region 502. The text in region 504 translates (from Russian) to "get 50% discount," and in region 506 to "click on picture." In this scenario, if a victim clicked on the picture, they would be taken to a gating website which would redirect them to a second website (also a redirector). Eventually, the user is directed to an adult dating website registration page through a GET request with various parameters filled (e.g., click_id) which can be used for monetization.

3. Static Image With a Play Button

Static images with play buttons can lure victims, having an expectation that they will watch a video, into clicking on such an image included in a phishing PDF. Two examples of such static images are shown in FIGS. 6A and 6B and are representative of themes commonly used in such attacks. In particular, the image shown in FIG. 6A appears to lead to a video about Bitcoin, and the image shown in FIG. 6B appears to lead to an adult content video. Of note, no message need be included in the document to help entice the victim into clicking (in contrast, for example, with a coupon-themed phishing PDF).

4. File Sharing

Figure 7A:
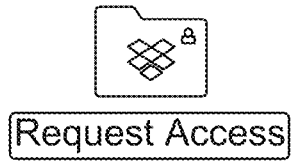
FIGS. 7A-7B illustrate examples of portions of phishing PDF files.
Figure 7B:
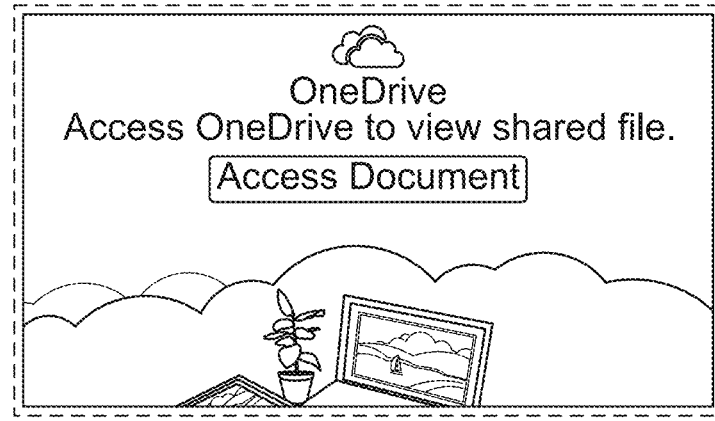
Figure 7C:
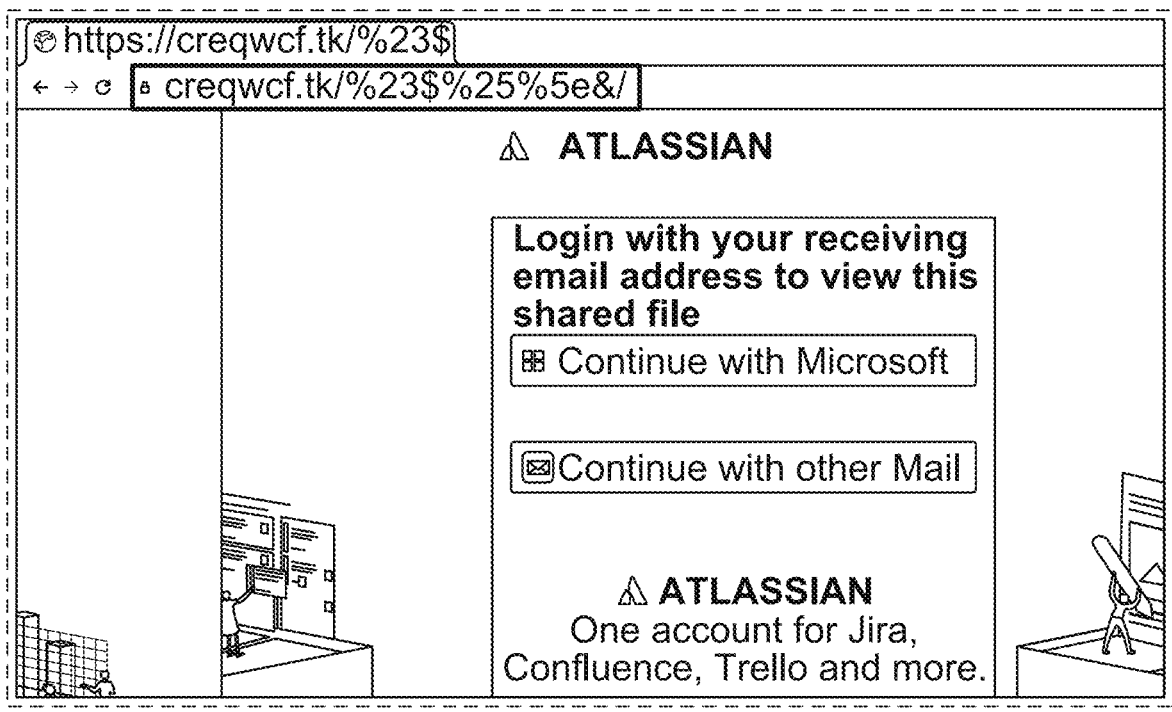
FIGS. 7C-7E illustrate examples of portions of phishing websites.
Figure 7D:
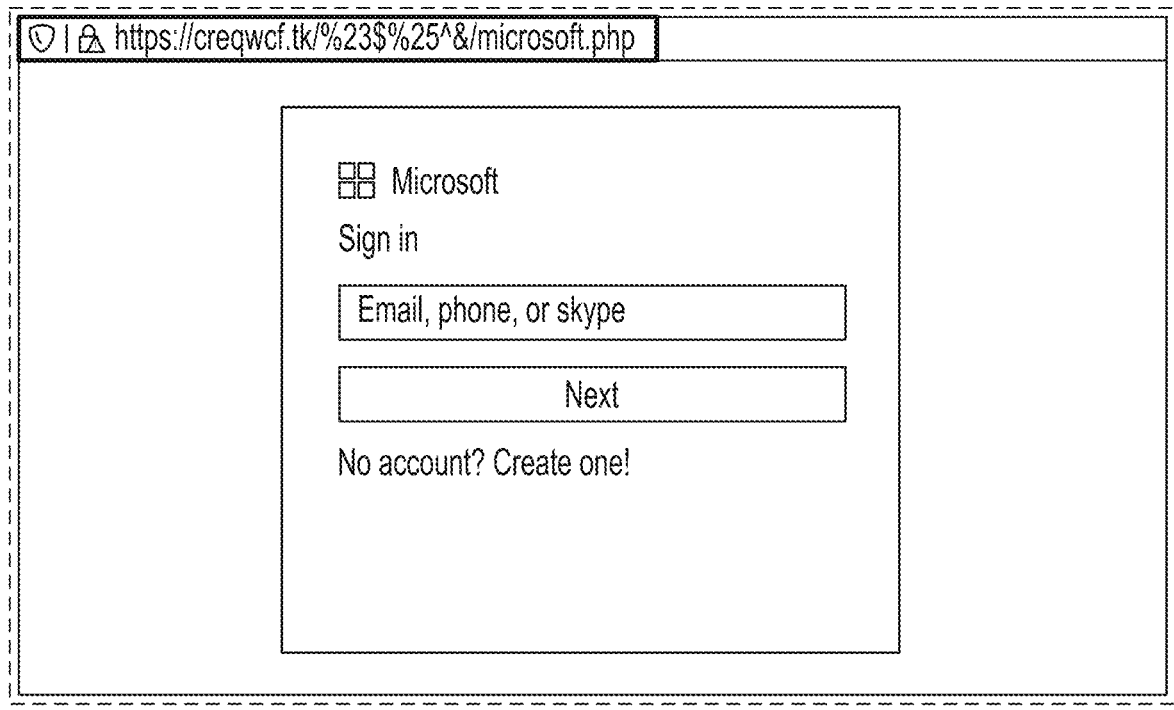
Figure 7E:
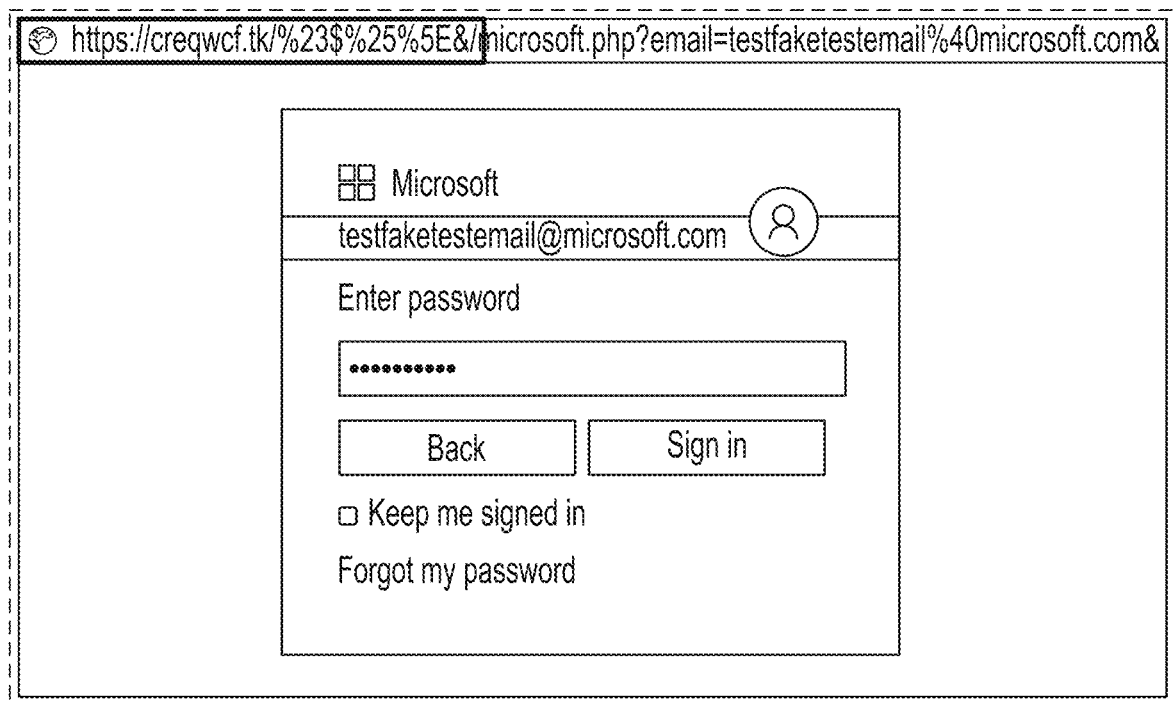

This category of phishing PDF file uses popular online file sharing services to grab the victim's attention. The phishing PDF files typically inform the victim that someone has shared a document with them. In order to see the content, the user is asked to click on an embedded button. An example of such a button is shown in FIG. 7A, which makes use of the DropBox logo in asking the user to "Request Access." Another example of such a button is shown in FIG. 7B, which makes use of the OneDrive logo to ask the user to click on the "Access Document" button. If the user clicks on one of those buttons (e.g., "Access Document" shown in FIG. 7B), they are then taken to what appears to be a legitimate login screen for an Atlassian instance (shown in FIG. 7C). The login screen presents two login options to the victim: logging in with a Microsoft email account, or an alternate email service. Atlassian is generally used by enterprises, and so an assumption can be made that this particular phishing page is targeting enterprise users. The links are designed to look like a legitimate email sign-on page. For example, if the victim clicks on the "Continue with Microsoft" button shown in FIG. 7C, they are then taken to a page (shown in FIG. 7D) that appears very similar to the legitimate login page: login.live.com (but is instead malicious). If the victim enters credentials into the dialog box shown in FIG. 7D, they are redirected to another (also fraudulent) page that solicits the victim's Microsoft email account password (shown in FIG. 7E). If the victim does enter such credentials into the fraudulent phishing page, they can be sent back to a server under control of the attacker through parameters in a GET request.

5. E-Commerce

Figure 8A:
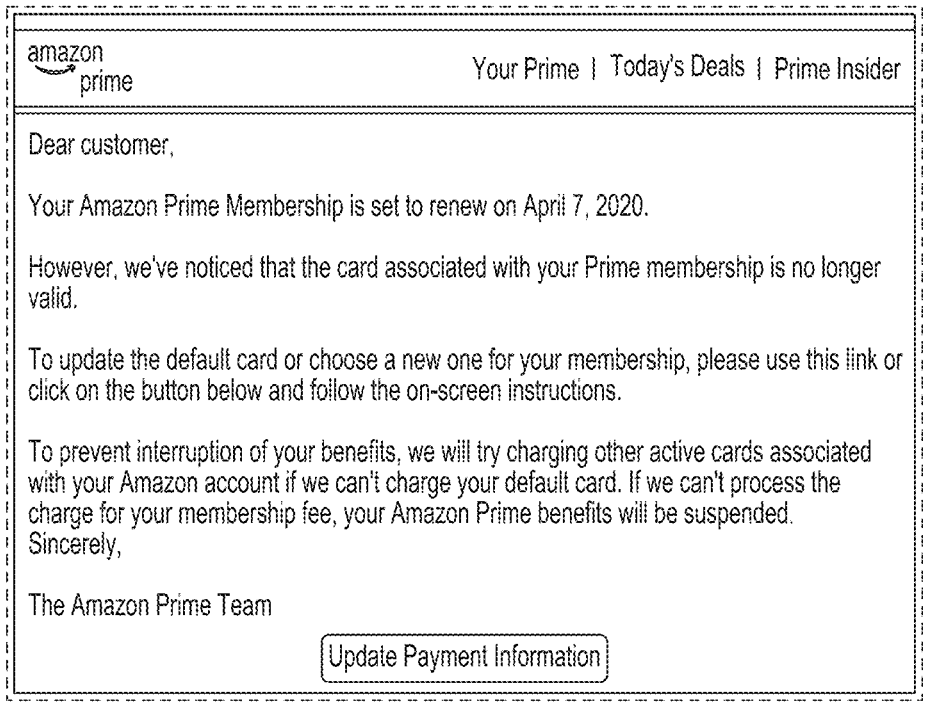
FIGS. 8A and 8B illustrate examples of portions of phishing PDF files.
Figure 8B:

In e-commerce phishing PDFs, corporate logos and seemingly legitimate messaging are used to encourage the victim to take a particular action with respect to common e-commerce sites. A first example is shown in FIG. 8A, in which the victim recipient of the phishing PDF is notified that their credit card is no longer valid and they will need to "update payment information" to not have their Amazon Prime benefit interrupted. A second example is shown in FIG. 8B, in which the victim recipient of the phishing PDF is informed that their Apple ID account will be suspended if they do not click on the link to update their information.

B. Approach Overview

As will be described in more detail below, an image-based learning approach can be used to detect phishing PDFs (and, as applicable, other types of documents, such as malicious Microsoft Office documents). In embodiments of the approach, one, some, or all pages of a given PDF are converted into images (as if taking a screenshot of an entire given page, including any images and/or any text rendered for a given page) and used to train a deep neural network on the converted images to distinguish between benign and phishing PDF files. As applicable, various performance enhancements can be used, such as using image-hashes to group and reduce PDFs to train on, and to denoise training dataset labels. The trained deep neural network can then be deployed to efficiently analyze PDFs while minimizing false positives.

C. Example Architecture

1. Overview

Figure 9:
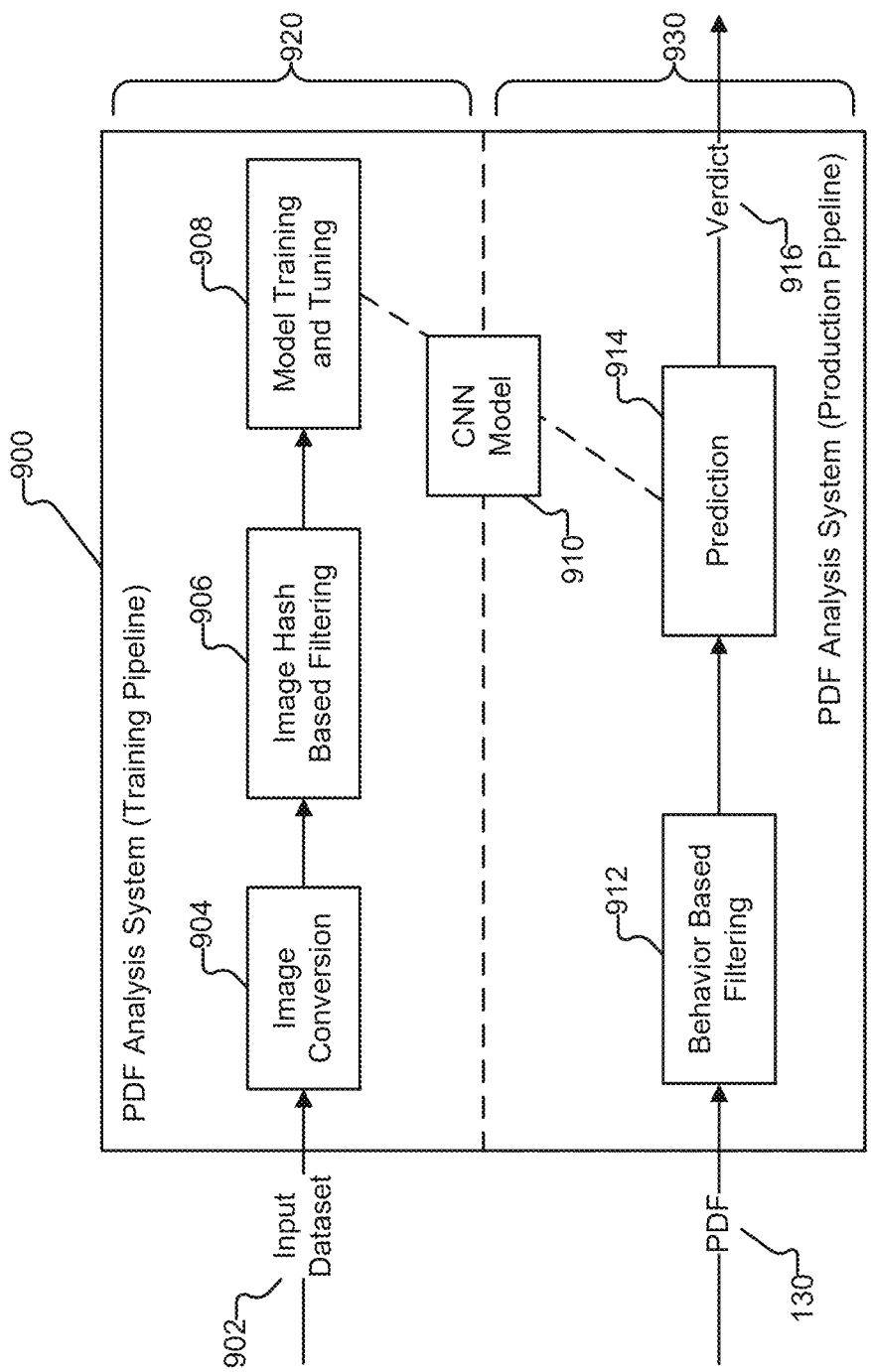
FIG. 9 illustrates functional components of an embodiment of a document analysis system.

FIG. 9 illustrates functional components of an embodiment of a document analysis system. As mentioned above, in various embodiments, security platform 122 includes document analysis system 152, an embodiment of which is shown in FIG. 9 as PDF analysis system 900. Components of PDF analysis system 900 can be implemented in a variety of ways, including as a set of one or more scripts (e.g., written in Java, python, etc., as applicable). As shown in FIG. 9, PDF analysis system 900 implements two pipelines: a training pipeline (920) and a production pipeline (930). The pipelines can be implemented on a single platform (as shown in FIG. 9) and can also be implemented separately (e.g., across a plurality of platforms). Similarly, various components (or subcomponents) of PDF analysis system 900 can be implemented on a single platform, and can also be implemented separately.

Training pipeline 920 takes as input one or more sets of PDFs labeled with ground truths (e.g., phishing PDF or benign PDF). In an example embodiment, input dataset 902 is stored in storage 142. The labeled PDFs are converted to images by image conversion module 904. An example way of implementing image conversion module 904 is using a set of one or more python scripts that make use of the PDF2image python module. As previously mentioned, if a particular PDF document includes multiple pages, one, some, or all pages of the PDF can be converted by image conversion module 904 and, as applicable, grouped per document (e.g., based on available computing resources of PDF analysis system 900, and/or applying a maximum number of pages of a PDF document to be processed so as to not examine all pages of lengthy documents such as textbooks). The converted images are then stored (e.g., also in storage 142). In some embodiments, an image-hash based filtering module 906 (or other appropriate filtering module) is used to reduce training volume (and, as applicable, without losing knowledge, by trimming out duplicate images). One example way of implementing image-hash based filtering module 906 is using the phash python package. In an example implementation, five samples per image-hash group are randomly selected for additional processing and the rest discarded. In some embodiments, TFRecord is used as a data format to store those samples selected by image-hash based filtering module 906 for model training. The TFRecord data is written to storage 142 as applicable. In the final portion of training pipeline 920, model training and tuning is performed by model training and tuning module 908. One example way of implementing model training and tuning module 908 is by using TensorFlow. In some embodiments, data shuffling is performed for each epoch of training.

As shown in FIG. 9, module 908 generates a convolutional neural network (CNN) model 910. Very strict false positive rate requirements can be used, such as a maximum rate of 0.0001%. Any true false positives discovered can be added to the benign training set and the model can be retrained. Other modeling techniques can also be used, as applicable. CNN model 910 is stored (e.g., in storage 142) and can subsequently be used in production pipeline 930 to detect phishing PDF documents, as will now be described in conjunction with an example scenario.

In an example attack scenario, suppose a malicious individual would like to target employees of ACME Corporation. The malicious individual might specifically target individual users (e.g., Alice), groups of users (e.g., the finance department), or any arbitrary users of enterprise network 140. The malicious individual creates malware 130, in this scenario, a phishing PDF document that appears to be an internal memo from ACMF Corporation inviting the recipient to sign up for a free gym membership. In particular, the PDF document includes an image that includes ACME's corporate logo with a message below to "click here to sign up." If Alice (or any other recipient)) clicks on the word "here," they will be taken to a credential phishing website that appears (e.g., similar to the sequence of screens shown in FIGS. 7C-7E) to legitimately be asking Alice for her enterprise email address and enterprise email password, when in fact the website is malicious.

Preventing these types of attacks can be particularly difficult. As one reason, in contrast to other types of files (e.g., ransomware included in a Windows PE file), traditional malware mitigation approaches such as fingerprint comparisons (e.g., MD5 hashes) and use of YARA rules (e.g., as performed by data appliance 102 in response to receipt of a file) are less suitable for detecting malicious PDF phishing documents. Of particular note, such traditional approaches are not able to be flexibly updated to detect newly evolving phishing attacks. For example, if attackers change the redirection of the embedded phishing URLs in PDFs, such PDFs can evade detection of existing YARA rules. The resulting false negatives need to be manually reviewed to generate new YARA rules in order to detect them, which is labor intensive. As noted above, this is particularly challenging with phishing PDF documents that make use of techniques such as redirection so as to avoid having hard coded links to malicious sites embedded within them.

Another approach to handling suspicious PDF documents (e.g., as received by data appliance 102 for which data appliance 102 is unable to determine a verdict of benign or malicious) is for security platform 122 to perform dynamic analysis on such documents (e.g., using dynamic analysis engine 310). A downside of this approach is that it is potentially very time consuming. Performing extensive dynamic analysis on every potentially suspicious PDF that is received (e.g., at security platform 122) is likely prohibitively resource intensive.

Production pipeline 930 can be used, in various embodiments, to efficiently determine whether a given PDF document presents a phishing attack, while also minimizing false positives. Again, suppose that data appliance 102 receives PDF document 130 (e.g., as addressed to Alice, as addressed to an alias for the finance department, and/or as addressed to a company-wide alias). Data appliance 102 (e.g., via maiware analysis module 112) performs local checks to attempt to determine whether or not PDF document 130 is malicious. Suppose that data appliance 102 is either unable to conclusively determine the PDF to be good (allow the message to be delivered) or bad (block the message). Data appliance 102 provides a copy of the PDF to security platform 122 for analysis and holds disposition of the message until a verdict is received from security platform 122. Upon receipt of the PDF document, PDF production pipeline 930 performs behavioral based filtering to reduce the workload for CNN model 910. As one example, behavior based filtering module 912 determines whether a given received PDF includes any clickable URLs. The determination can be made by filtering module 912 examining a static analysis report 308 for the PDF (if such static analysis has been performed). The determination can also be made directly by filtering module 912 performing a limited examination of the received PDF (e.g., prior to any static or dynamic analysis that might otherwise be performed on the PDF), based on implementation details (e.g., based on available resources of VM server 124 and/or virtual machines such as virtual machine 126). The PDF being analyzed need not itself include any images in order to potentially be a phishing PDF. Indeed, it may often be the case that it is difficult to determine whether a given PDF includes an image or not through purely static analysis (e.g., because various elements of the PDF document may be dynamically loaded).

If behavior based filtering module 912 determines that the received PDF does include at least one clickable URL, phishing prediction module 914 (e.g., implemented as one or more python scripts) can use CNN model 910 to obtain a verdict 916 for the file (e.g., by converting each page of PDF 130 to an image and determining a prediction). The verdict can then be provided to data appliance 102 so that data appliance 102 can select an appropriate disposition of the message that contained the PDF. If behavior based filtering module 912 determines that the received PDF does not include any clickable URLs, other processing can be performed (e.g., by static analysis engine 306 and/or dynamic analysis engine 310) as applicable.

D. Example Process

Figure 10:
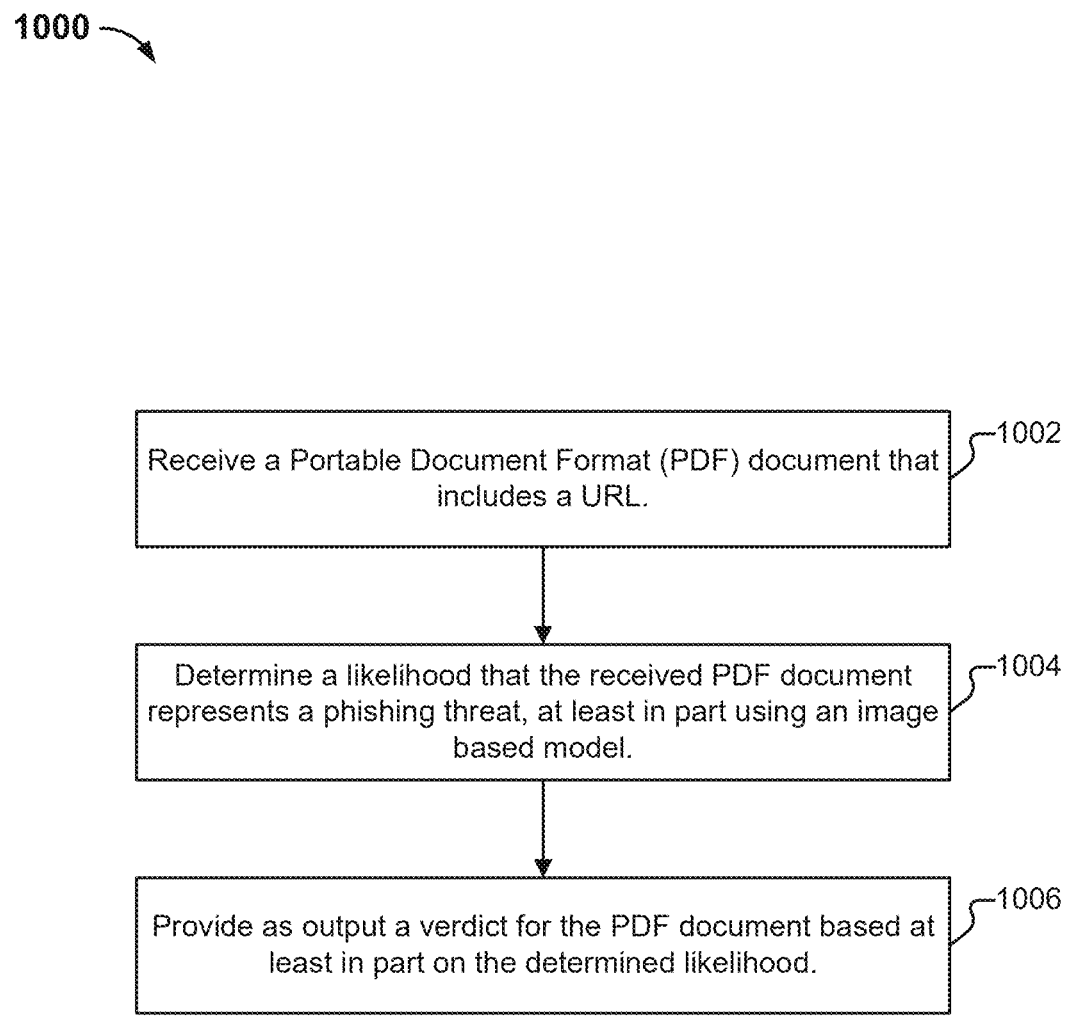
FIG. 10 illustrates an embodiment of a process for determining a likelihood of whether a document represents a phishing threat.

FIG. 10 illustrates an embodiment of a process for determining a likelihood of whether a document represents a phishing threat. In various embodiments, process 1000 is performed by platform 122, and in particular by an embodiment of document analysis system 152 (e.g., PDF analysis system 900). In some embodiments, process 1000 (or portions thereof) are performed by malware analysis module 112. As one example, if CNN model 910 is sufficiently small and the resources of data appliance 102 are sufficiently large, process 1000 can be performed on data appliance 102.

Process 1000 begins at 1002 when a PDF document that includes a URL is received. As one example, such a PDF (e.g., as malware 130) is received by security platform 122 from data appliance 102 as described in the scenario discussed in the previous section. At 1004, a determination of a likelihood that the received PDF document represents a phishing threat is made, at least in part using an image based model. As an example of processing performed at 1004, prediction module 914 uses CNN model 910 to determine a likelihood that the received PDF represents a phishing threat. A verdict corresponding to the prediction (e.g., phishing or not) is provided as output at 1006.

Data appliance 102 (or another appropriate entity) can take an action with respect to the PDF based on the verdict. As mentioned above, examples include: allowing a message that includes the PDF to be delivered (if the verdict indicates the PDF is benign) and blocking delivery of a message that includes the PDF (if the verdict indicates phishing). Of note, process 1000 can be performed in conjunction with other analyses of the PDF document. For example, while a verdict of "not phishing" may be returned by PDF analysis system 900, the PDF may not necessarily be benign. For example, the PDF may include malicious executable code. Accordingly, as applicable, a verdict of "not phishing" can cause additional processing to be performed (e.g., dynamic analysis) and/or such additional processing can be performed in parallel (e.g., by other modules that use models trained using other kinds of malicious PDFs, heuristic analysis, etc.).

VI. ADDITIONAL TYPES OF MALWARE DETECTION FOR DOCUMENTS

A. Introduction

As mentioned above, security platform 122 can process a variety of different kinds of files using a variety of techniques. Two approaches to evaluating Microsoft Office documents (e.g., Microsoft Word (.rtf, .doc, .docx) and Microsoft Excel (.xls, .xlsx)) include performing static analysis and/or dynamic analysis on those documents (e.g., using sample analysis system 300). Unfortunately, some limitations exist with these approaches. As one example, static analysis relies on the use of a static analysis parser. The various Microsoft Office formats have changed over time, and while some documentation of the formats exists, such documentation is incomplete. An adversary could exploit an undocumented aspect of a Microsoft Office format and evade detection by the parser. As another example, current versions of Microsoft Office software (e.g., Word 2021 or Excel 2021) are not fully backwards compatible with documents created using older versions of Microsoft Office software (e.g., Word 2007 or Excel 2007). Similarly, older versions of Microsoft Office software will not be able to open more recently generated files. As a result, some documents will open in some versions of Office software and other documents (even some benign ones) will not open or will cause those (or other) versions of Office software to crash. Discerning which version of Microsoft Office should be used during dynamic analysis is difficult. Further, opening a given document in multiple versions of Microsoft Office during dynamic analysis is resource intensive and still does not guarantee that the file will open or that a crash will not occur.

As mentioned above, the image-based deep learning techniques described above can be used on Microsoft Office documents. Many malicious documents are visually similar. As one example, such documents can include an image that purports to be a link to DocuSign but instead leads to a phishing website. As another example, such documents can include an image that purports to come from a reputable software company that instructs an unsuspecting end user to "click on Enable Editing" and "click on Enable content" to "unlock" content purported to be protected by encryption provided by the software company. In typical corporate environments, macros are disabled by default, and the malicious document relies on a human interaction to component to detonate.

As with PDF detection models described above, an image model can be trained on screenshots of known malicious and known good Microsoft Office documents. One example implementation of an image model is as a two dimensional CNN that contains four two dimensional convolutional layers, each followed by a max pooling layer. The output of the convolutional layers are flattened and fed into two dense layers to output the final classification result. Unfortunately, using an image model for Office Document detection has limitations not present (or less problematic than) when using an image model to analyze PDF documents. As one example, embodiments of sample analysis system 300 use the open source Libre Office suite running on the Ubuntu operating system to view Microsoft Office documents during production (e.g., to analyze document 130). A significant amount of resources can be consumed when using such tools to convert Office Documents into images (e.g., via an embodiment of image conversion module 904). In a production environment, performing such conversions can be infeasible. Further, as mentioned above, some Microsoft Office documents will fail to open or be correctly parsed (precluding their conversion to images).

In various embodiments, document analysis system 152 makes use of one or more trained raw bytes models (e.g., trained using the raw bytes of samples labeled as malicious or benign) in conjunction with one or more trained image models to improve detection of malicious Microsoft Office documents. One example implementation of a raw bytes model is as a one dimensional CNN that contains one embedding layer and three one-dimensional convolutional layers, each followed by a max pooling layer. The output of the convolutional layers are flattened and fed into two dense layers to output a final classification result.

One approach to improving detection is to use the set of image models and the set of raw bytes models in an ensemble. Each type of model has benefits and drawbacks, and using an ensemble approach broadens the detection capabilities of security platform 122. As noted above, however, using an image model in production may be resource prohibitive. An alternate approach is to use offline image analysis/modeling in conjunction with training a raw bytes model, and then use the trained raw bytes model (which has been influenced by image modeling) in production. Two techniques for generating raw bytes models are as follows.

B. Using Knowledge Distillation Assisted Learning

Figure 11:
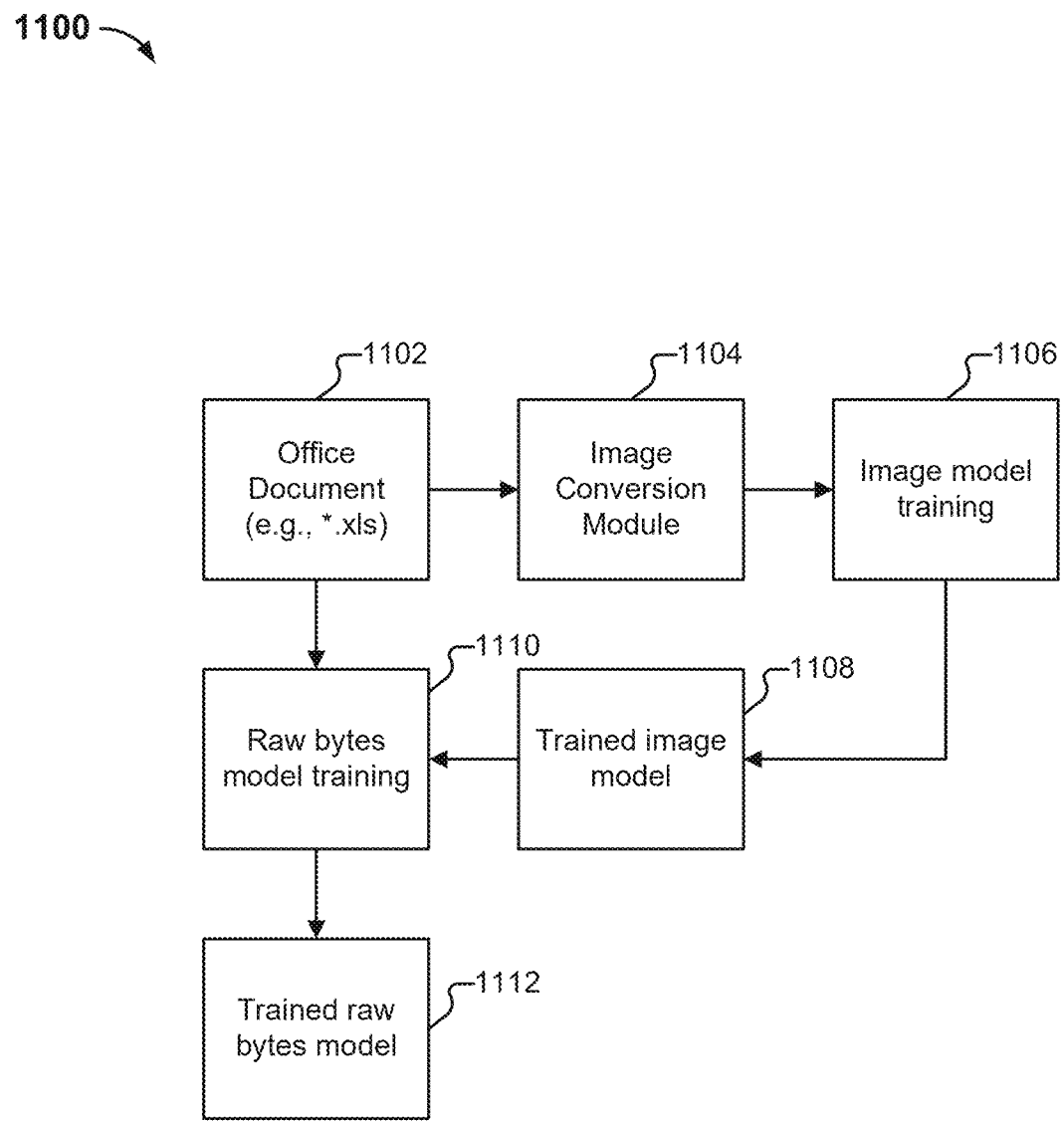
FIG. 11 illustrates an embodiment of a pipeline for generating a trained raw bytes model.

FIG. 11 illustrates an embodiment of a pipeline for generating a trained raw bytes model. As with PDF analysis system 900, components of pipeline 1100 can be implemented in a variety of ways, including as a set of one or more scripts (e.g., written in Java, python, etc., as applicable). Pipeline 1100 can be implemented on a single platform (e.g., as document analysis system 152 or a portion thereof) and can also be implemented separately (e.g., across a plurality of platforms). Similarly, various components (or subcomponents) of document analysis system 152 can be implemented on a single platform, and can also be implemented separately. In this pipeline, an image based model is first trained (using converted document images) and the trained image model is then used to guide the training of the raw bytes model (the two models having different feature sets trained from two different views of the same data source). This places an extra regularization term in the model training process and helps the trained raw bytes model to fit future unseen data better.

Pipeline 1100 takes as input one or more sets of Office Documents (e.g., *.xls files) 1102 labeled with ground truths (e.g., malicious Office Document or benign Office Document). In an example embodiment, input dataset 1102 is stored in storage 142. The labeled Office Documents are converted to images by image conversion module 1104. An example way of implementing image conversion module 1104 is using a set of one or more python scripts that first converts the Office Document to a PDF (e.g., using libreoffice, unoconv, or abiword) and then converts the PDF to an image (e.g., using the PDF2image python module). If a particular Office Document includes multiple pages (worksheets, etc.), one, some, or all pages of the Office Document can be converted by image conversion module 1104 and, as applicable grouped per document (e.g., based on available computing resources of document analysis system 152, and/or applying a maximum number of pages/worksheets to be processed so as to not examine all pages of lengthy documents). The converted images are then stored (e.g., also in storage 142). In some embodiments, an image hash based filtering module (an embodiment of module 906) or other appropriate filtering module is used to reduce training volume (and, as applicable, without losing knowledge, by trimming out duplicate images). In some embodiments, TFRecord is used as a data format to store those samples selected for model training. The TFRecord data is written to storage 142 as applicable. Image model training and tuning is performed at 1106. One example way of implementing image model training/tuning is by using TensorFlow. In some embodiments, data shuffling is performed for each epoch of training. The image model is trained to a best epoch (e.g., using validation to choose the best model) and then its parameters are frozen (e.g., as trained image model 1108).

Office Documents 1102 (and their ground truth labels) are provided as input to train a raw bytes model. During raw bytes model training 1110, using knowledge distillation, the raw bytes model learns from both the provided ground truth labels and also learns from image model prediction probabilities ($P_2$). In this approach to raw bytes model training, the loss function comprises both self loss and imitation loss. For example, the Loss function can be given as: $L=\alpha \cdot L_c(P_1, GT)+(1-\alpha) \cdot D_{KL}(P_1 \| P_2)$, where the self loss is a regular cross entropy loss that optimizes for $P_1$ (its own model prediction towards the ground truth GT), and the imitation loss is a Kullback-Leibler (KL) divergent loss. KL divergence is an equation where if two probability distributions are similar, then the equation will have a small value. By minimizing the KL divergence and making sure that $P_1$ and $P_2$ are similar in distribution, the model output for the raw bytes model ($P_1$) is optimized not only to output ground truths, but also optimized to be similar with $P_2$. Alpha is a hyperparameter which controls how much is learned from the ground truth label and how much is learned from the image model prediction ($P_2$). The result of pipeline 1100 is a trained raw bytes model 1112 that learned from both ground truth labels and what image model 1108 learned during image model training 1106. Model 1112 can be used in a variety of ways. As one example, model 1112 can be used by document analysis system 152 to evaluate Microsoft Office documents at security platform 122 (e.g., as provided to security platform 122 by data appliance 102 and then evaluated by static analysis engine 306 consulting model 1112 and including results in static analysis report 308). As another example, because model 1112 is lightweight, it can also be provided (or a version of it can be produced and provided) to data appliance 102 as part of a content subscription, allowing data appliance 102 to perform inline (local) analysis of at least some Office Documents received at data appliance 102 (without having to provide copies of those Office Documents to security platform 122).

C. Using Deep Mutual Learning

Figure 12:
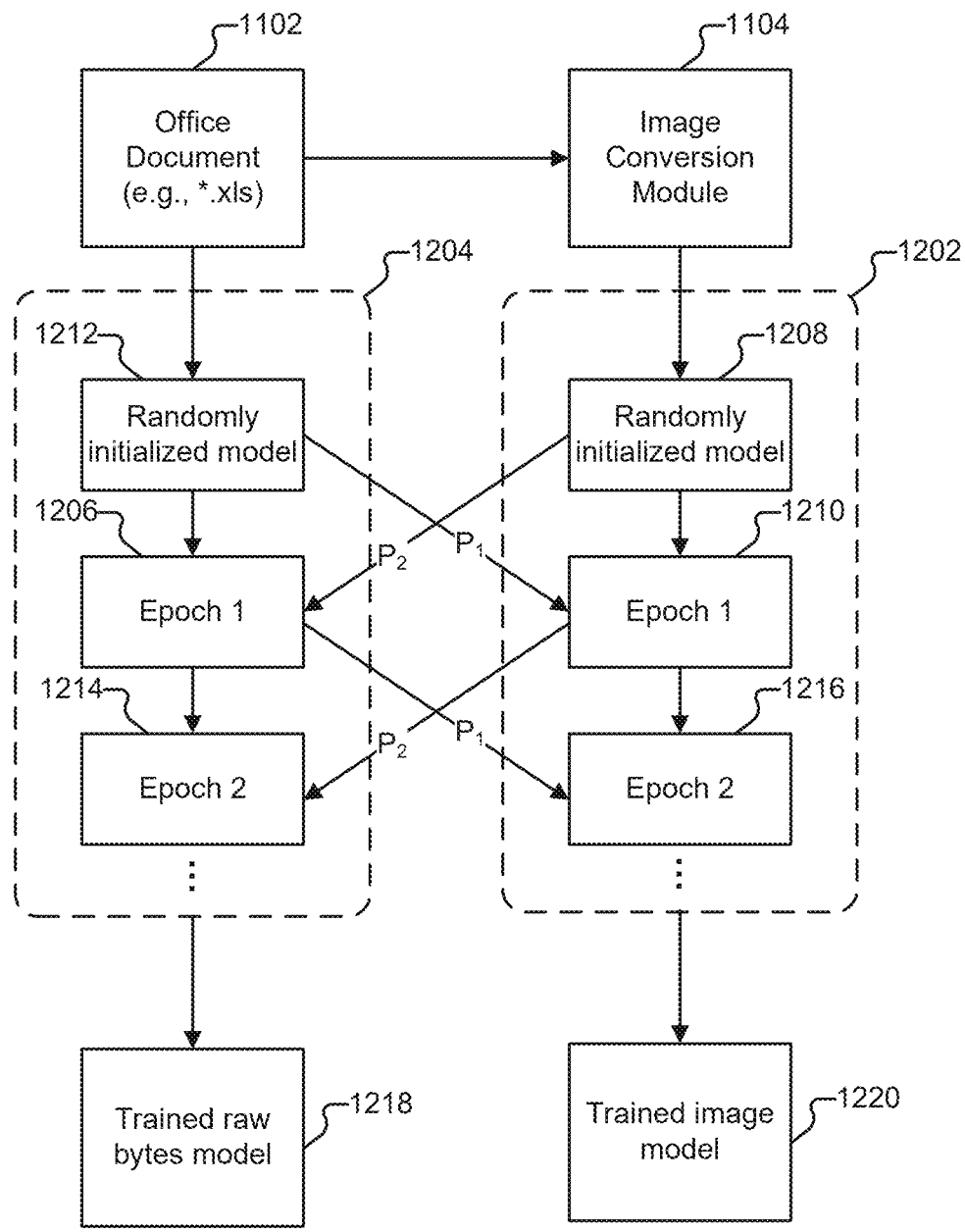
FIG. 12 illustrates an embodiment of a pipeline for generating a trained raw bytes model.

FIG. 12 illustrates an embodiment of a pipeline for generating a trained raw bytes model. As with pipeline 1100, one or more sets of Office Documents 1102 labeled with ground truths are converted into images by image conversion module 1104 and then provided as input to image model training and also provided as raw bytes to raw bytes model training. However, in this pipeline, the image model training (1202) and the raw bytes model training (1204) are performed simultaneously/mutually, with each model trained to mimic its peer model for each epoch of optimization.

Both of the training processes begin with randomly initialized models (e.g., models 1212 and 1208, respectively). At each successive epoch during the training, both ground truth labels and prediction from the peer model's previous model are used. For example, during epoch 1 of the raw bytes model training (1206), it learns from both ground truth labels (of the raw bytes) and from the image model predictions ($P_2$) of randomly initialized model 1208. Similarly, during epoch 1 of the image model training (1210), it learns from both ground truth labels (of the images) and from the raw bytes model predictions ($P_1$) of randomly initialized model 1212. Likewise, during epoch 2 of raw bytes model training (1214) and image model training (1216) learning is based on both ground truths and peer predictions from the previous epoch. In this approach, the model loss function includes both self loss and imitation loss. In the case of the raw bytes model, the loss function can be given as: $L=\alpha_1 \cdot L_c(P_1, GT)+(1-\alpha_1)\cdot D_{KL}(P_1\|P_2)$ and in the case of the image model, the loss function can be given as: $L=\alpha_2 \cdot L_c(P_2, GT)+(1-\alpha_2)\cdot D_{KL}(P_1\|P_2)$. The process continues until a best epoch for the raw bytes model is reached (e.g., using validation to choose the best model) and then published (e.g., as trained bytes model 1218), e.g., to a production environment.

As with the previous approach, this approach results in better extra regularization in the model training process but helps not only the trained raw bytes model to fit future unseen data better, but also helps the trained image model (e.g. model 1220) find a better/wider range of model parameters that can predict the ground truth label and raw bytes model prediction at the same time. Thus, in this approach, both the raw bytes model and the image model attempt to find a wider range of model parameters for a wider local minimum.

In some embodiments, additional data sets are used to achieve a semi-supervised learning process in which not all training data is labeled and/or is problematic. In such a scenario, the raw bytes model loss function can be revised to cover additional data sources. In particular, the raw bytes model loss function can be described as the sum of each of the following (for which such training data is used):

Raw bytes files with ground truths but no corresponding images: $L_c(P_1, GT)$. Here, only self loss is applied because a corresponding image prediction ($P_2$) does not exist.

Raw bytes files with ground truths and clean labels (e.g., are determined by image hash not to have blank first pages, not to appear in both malware and benign training sample documents, etc.): $\alpha_1 \cdot L_c(P_1, GT)+(1-\alpha_2)\cdot D_{KL}(P_1\|P_2)$. This is the loss function described above (using both self loss and imitation loss).

Raw bytes files which have noisy label data: $D_{KL}(P_1\|P_2)$. Here, only imitation loss is applied as the ground truth labels are not trustworthy.

Image convertible data that lacks ground truths (e.g., customer samples): $D_{KL}(P_1\|P_2)$. Here, only imitation loss is applied.

If all of the above four types of files are used in training, the loss function can be customized as applicable based on the kinds of data included in the training sets.

D. Example Process

Figure 13:
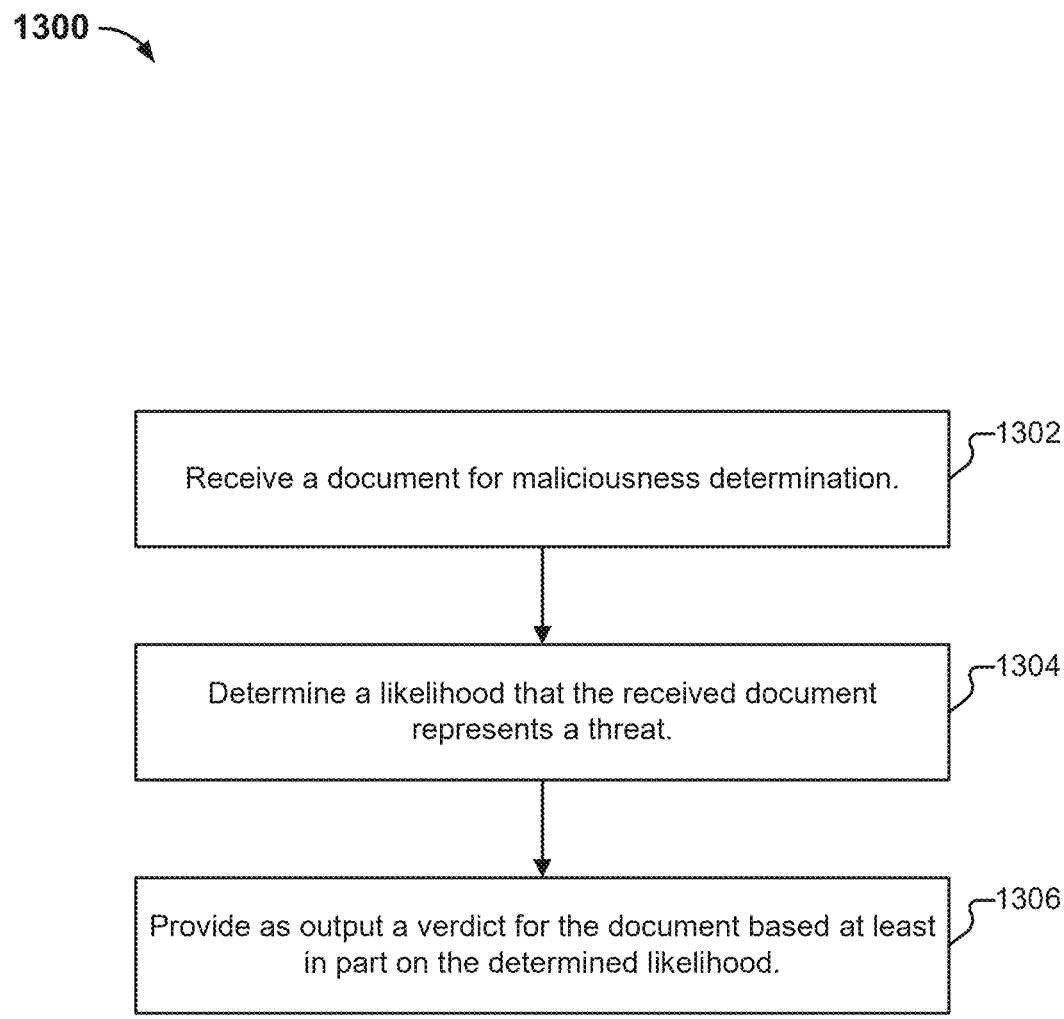
FIG. 13 illustrates an embodiment of a process for determining a likelihood of whether a document represents a threat.

FIG. 13 illustrates an embodiment of a process for determining a likelihood of whether the document represents a threat. In various embodiments, process 1300 is performed by platform 122, and in particular, by an embodiment of document analysis system 152. In some embodiments, process 1300 (or portions thereof) are performed by malware analysis module 112. As one example, if CNN model 1112 is sufficiently small and the resources of data appliance 102 are sufficiently large, process 1300 can be performed on (or at least in part on) data appliance 102.

Process 1300 begins at 1302 when a document is received for maliciousness determination. As one example, such a document (e.g., a Microsoft Excel file or a Microsoft Office file) is received by security platform 122 from data appliance 102. At 1304, a determination of a likelihood that the received document represents a threat is made, at least in part using a raw bytes model. Examples of such raw bytes models include both raw bytes mode 1112 and raw bytes model 1218. A verdict corresponding to the prediction (e.g., whether the received document poses a threat or not) is provided as output at 1306.

Data appliance 102 (or another appropriate entity) can take an action with respect to the document based on the verdict. As mentioned above, examples include: allowing a message that includes the document to be delivered (if the verdict indicates the document is benign) and blocking delivery of a message that includes the document (if the verdict indicates the document is malicious). Of note, process 1300 can be performed in conjunction with other analyses of the document. For example, as mentioned above, one or more models can each be consulted (of which the raw bytes model is one example) in an ensemble scenario. If the raw bytes model verdict has a lower confidence than a result of another model (or other static/dynamic evaluation), a verdict from a different such model can be assigned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a document for a maliciousness determination;
determine a likelihood that the document received for the maliciousness determination represents a threat, at least in part using a raw bytes model, wherein the raw bytes model was trained, at least in part, using image model prediction probabilities obtained from an image model trained, at least in part, using a plurality of images generated in a pipeline that converts a plurality of documents labeled as malicious into a corresponding plurality of rendered images of those documents, wherein at least some of the corresponding plurality of rendered images are rendered, collectively, from a multi-page document labeled as a malicious document; and provide as output a verdict for the document based at least in part on the determined likelihood, wherein the verdict is that the received document is benign; and a memory coupled to the processor and configured to provide the processor with instructions.

2. The system of claim 1, wherein determining the likelihood does not require converting a portion of the received document into an image.

3. The system of claim 1, wherein, prior to training the image model, an image hash-based filtering operation is performed on at least some of the plurality of images labeled as malicious documents.

4. The system of claim 3, wherein filtered images are stored using a TFRecord data format.

5. The system of claim 1, wherein the processor is further configured to generate the image model.

6. The system of claim 1, wherein the image model is a convolutional neural network model.

7. The system of claim 1, wherein the raw bytes model is a convolutional neural network model.

8. The system of claim 1, wherein, at least in part in response to receiving an indication of a false positive result, the image model is retrained using a benign data set that includes the false positive result.

9. The system of claim 1, wherein the document is a Microsoft Office document.

10. The system of claim 1, wherein training the raw bytes model includes using knowledge distillation.

11. The system of claim 1, wherein a loss function used in training the raw bytes model comprises both self loss and imitation loss.

12. A method, comprising:

receiving a document for a maliciousness determination;

determining a likelihood that the document received for the maliciousness determination represents a threat, at least in part by using a raw bytes model, wherein the raw bytes model was trained, at least in part, using image model prediction probabilities obtained from an image model trained, at least in part, using a plurality of images generated in a pipeline that converts a plurality of documents labeled as malicious into a corresponding plurality of rendered images of those documents, wherein at least some of the corresponding plurality of rendered images are rendered, collectively, from a multi-page document labeled as a malicious document; and providing as output a verdict for the document based at least in part on the determined likelihood, wherein the verdict is that the received document is benign.

13. A computer program product embodied in a non-transitory computer readable medium and comprising computer instructions for:

receiving a document for a maliciousness determination;

determining a likelihood that the document received for the maliciousness determination represents a threat, at least in part by using a raw bytes model, wherein the raw bytes model was trained, at least in part, using image model prediction probabilities obtained from an image model trained, at least in part, using a plurality of images generated in a pipeline that converts a plurality of documents labeled as malicious into a corresponding plurality of rendered images of those documents, wherein at least some of the corresponding plurality of rendered images are rendered, collectively, from a multi-page document labeled as a malicious document; and providing as output a verdict for the document based at least in part on the determined likelihood, wherein the verdict is that the received document is benign.

14. The method of claim 12, wherein determining the likelihood does not require converting a portion of the received document into an image.

15. The method of claim 12, wherein, prior to training the image model, an image hash-based filtering operation is performed on at least some of the plurality of images labeled as malicious documents.

16. The method of claim 15, wherein filtered images are stored using a TFRecord data format.

17. The method of claim 12, further comprising generating the image model.

18. The method of claim 12, wherein the image model is a convolutional neural network model.

19. The method of claim 12, wherein the raw bytes model is a convolutional neural network model.

20. The method of claim 12, wherein, at least in part in response to receiving an indication of a false positive result, the image model is retrained using a benign data set that includes the false positive result.

21. The method of claim 12, wherein the document is a Microsoft Office document.

22. The method of claim 12, wherein training the raw bytes model includes using knowledge distillation.

23. The method of claim 12, wherein a loss function used in training the raw bytes model comprises both self loss and imitation loss.

* * * * *